May 24, 1955　　　B. I. ULINSKI　　　2,708,998
FRUIT CONVEYOR
Filed Oct. 17, 1950　　　2 Sheets-Sheet 1
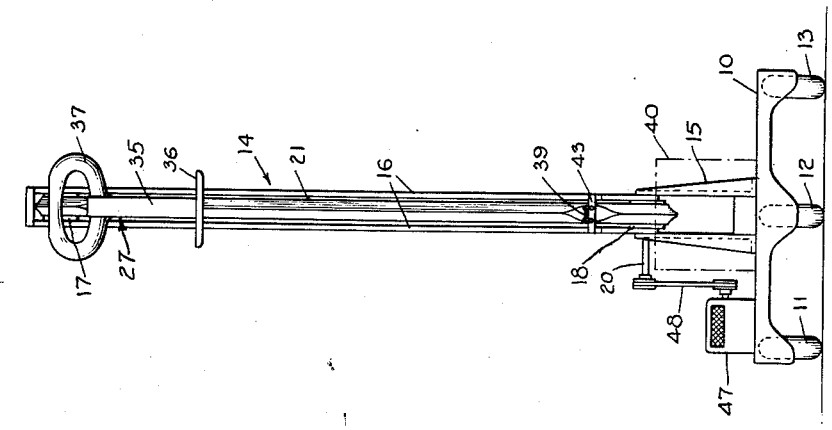
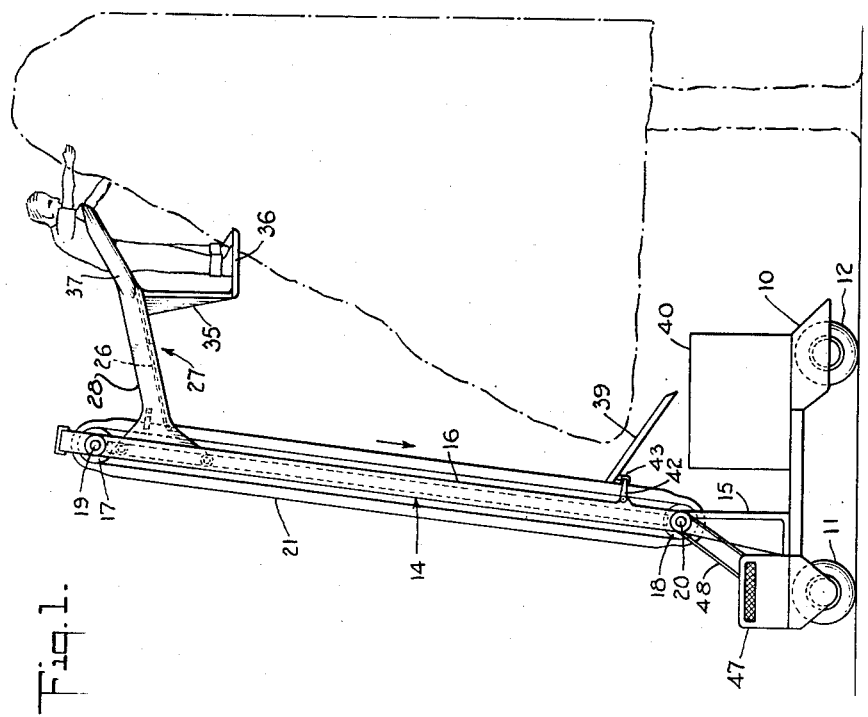
INVENTOR
B. I. Ulinski
BY
A. H. Golden
ATTORNEY May 24, 1955
B. I. ULINSKI
2,708,998
FRUIT CONVEYOR
Filed Oct. 17, 1950
2 Sheets-Sheet 2
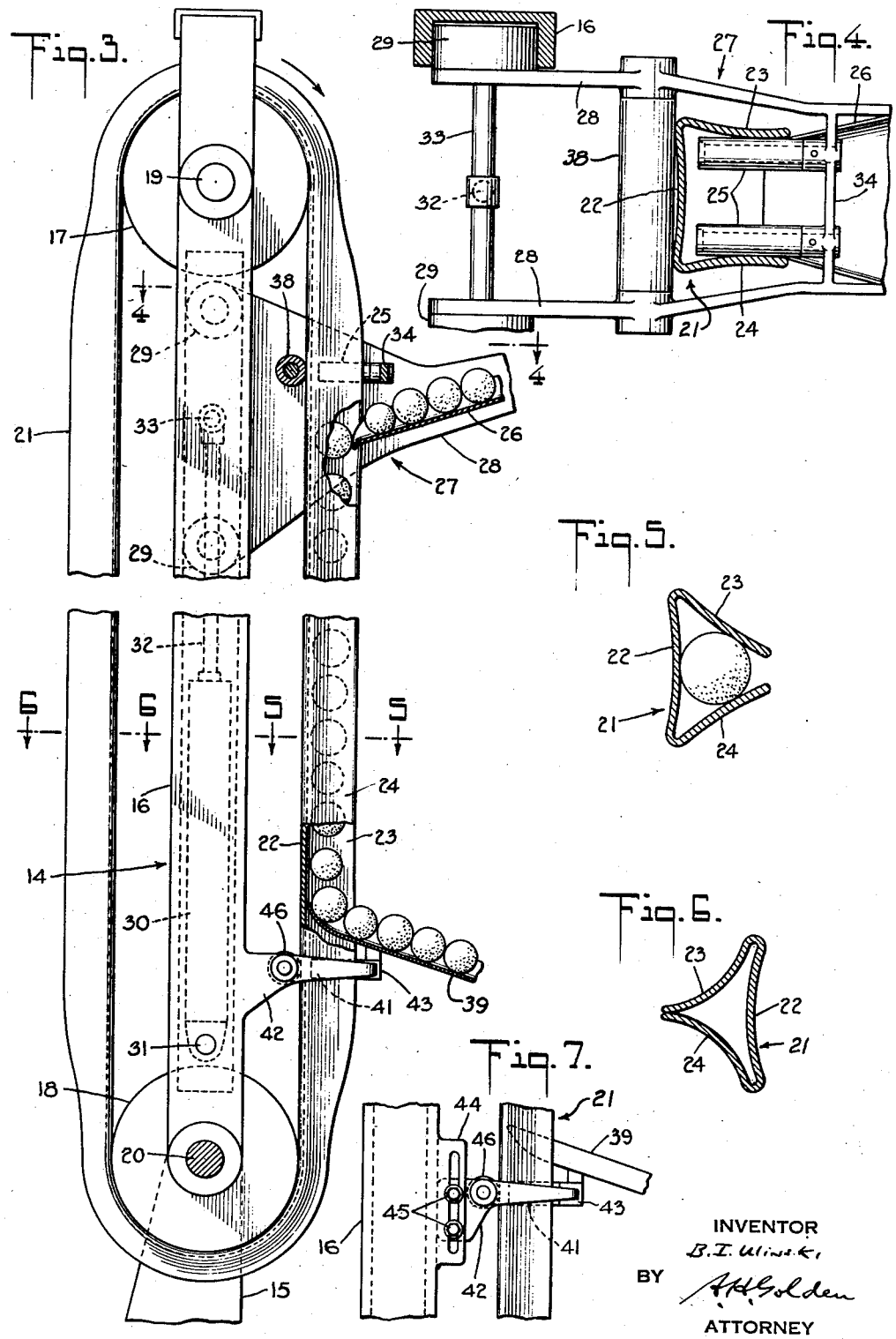
INVENTOR
B. I. Ulinski,
BY
A. H. Golden
ATTORNEY

United States Patent Office 2,708,998
Patented May 24, 1955

2,708,998

FRUIT CONVEYOR

Bronislaus I. Ulinski, Chicago, Ill., assignor to The Yale & Towne Manufacturing Company, Stamford, Conn., a corporation of Connecticut Application October 17, 1950, Serial No. 190,631

13 Claims. (Cl. 198—51)

This invention relates to a conveyor, and more particularly to a conveyor for fruit in which the fruit is held between opposed traveling members.

A feature of this invention resides in a conveyor wherein the conveyed fruit will be held with a gentle resilient pressure which will prevent relative movement of the individual fruit, thus avoiding injury to the fruit or other delicate articles which may be handled by the conveyor.

A further feature is the provision of a conveyor having means for feeding articles into position between the traveling members at any desired point along the length of the conveyor.

A still further feature of the invention resides in providing a conveyor wherein the opposed traveling members are in the form of a flanged conveyor belt in which the conveyed articles are held by the resilient action of the belt itself, thus avoiding any necessity for guides, rollers, or other means which would otherwise be required for confining the opposed members.

Another feature is the provision of a novel conveyor which will be especially useful for lowering fruit toward the ground as an operation incidental to fruit picking. The conveyor is so constructed that it may receive and grip the individual fruit gently at substantially any point on any level adjacent the fruit tree, and will protect the individual fruit against injury while it is being lowered. When the fruit in the conveyor has descended to a desired level, it will be removed from the conveyor by a suitable adjustable device which may include as part thereof a chute for directing the fruit into a receptacle.

The invention also contemplates that, when the conveyor is to be used in fruit picking operations, the means for feeding the fruit thereto will be mounted on a carriage which is adjustable longitudinally of the conveyor. The carriage will preferably have a platform or other means for supporting a person picking the fruit in such a position that the conveyor feeding means will be within his reach. This construction will greatly facilitate the fruit picking operation since the picker may always feed the fruit to the conveyor with a minimum of effort, even though the carriage may be moved to different positions as the picking operation progresses.

As a further development of the invention, the conveyor will be mounted in an upright position upon a truck, thus forming in combination a machine which may be readily operated and maneuvered to lower fruit from substantially any point about a fruit tree. A motor for operating the conveyor will be mounted upon the truck, and the carriage will be movable longitudinally of the carriage with suitable manually operable controls provided to enable the picker to have complete control of his position and permitting him to strip the tree completely of fruit without descending to the ground and without the assistance of another person. In order to avoid spilling the fruit discharged from the conveyor when the machine is moved, the truck is adapted to support a box in a position to receive the fruit from the conveyor.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important therefore, that the claims to be granted me shall be of sufficient breadth to prevent the appropriation of my invention by those skilled in the art.

Referring now to the drawing, Fig. 1 is a side view showing a machine embodying the improved conveyor as it would appear when located in operating position adjacent a fruit bearing tree, the latter being indicated in broken lines.

Fig. 2 is a front view of the machine, the discharge chute, as shown, being broken away.

Fig. 3 is a fragmentary side view of the conveyor, partly in section and on an enlarged scale, showing the conveyor belt as it would appear in operation.

Fig. 4 is a fragmentary cross-sectional view taken substantially on the line 4—4 of Fig. 3, but on a still larger scale, showing the relationship of the carriage to the belt.

Fig. 5 is a cross-sectional view taken on the line 5—5 of Fig. 3, showing the manner in which an article is gripped by the belt.

Fig. 6 is a cross-sectional view taken on the line 6—6 of Fig. 3, illustrating the shape the belt will assume when it is empty.

Fig. 7 is a fragmentary side view similar to a portion of Fig. 3, but showing a bracket which is adjustable in order to vary the point at which the fruit is discharged from the conveyor.

In the drawing, the numeral 10 indicates a conveyor base in the form of a self-propelled truck having three ground engaging wheels, 11, 12, and 13 disposed in a triangular arrangement. As a means for supporting an elongated conveyor frame 14 in an upstanding position upon the truck 10, the upper side of said truck is provided with a U-shaped pedestal 15. The conveyor frame 14 comprises a pair of parallel side uprights 16 which are fixed between the sides of the pedestal 15, and which carry a pair of pulleys 17, 18 upon shafts 19, 20 between upper and lower end portions thereof.

Engaged over the pulleys 17, 18 so as to be movable in an approximately vertical path is a novel endless conveyor belt 21, the construction of which may best be seen in Figs. 4, 5, and 6. The belt 21 is formed of rubber or other suitable resilient material and comprises a longitudinal central base portion 22 having longitudinally continuous side flanges 23, 24 integrally joined to opposite edges thereof. The flanges 23, 24, are pressed toward each other to inwardly inclined positions by the inherent resiliency of the belt material and, when the belt is not loaded, the free edges of the flanges will lie in contact with each other, or nearly so, as shown in Fig. 6.

It will thus be seen that the base portion 22 and the side flanges 23, 24 constitute opposed traveling members adapted to exert a gentle gripping pressure upon articles such as fruit which may be inserted between them, so that the fruit will be frictionally held while it is conveyed by the belt 21. Moreover, because the belt acts with yielding pressure to hold its side flanges 23, 24 in inclined positions, the belt can accommodate itself to somewhat different sizes of fruit and will hold the fruit effectively even though the different sizes of fruit may be located immediately adjacent each other in the belt. The normal inward curvature of the base portion 22 and the side flanges 23, 24, as seen in Fig. 6, contributes to the action of the belt in holding fruit of varying sizes, and enables the belt to engage smaller sizes of fruit at opposed sides.

In view of the fact that the belt flanges 23, 24 must be spread or deflected outwardly in order to admit the individual fruit to the belt, provision is made of a pair of spaced rollers 25 which are engaged between the flanges 23, 24 on the downwardly moving portion of the belt and slightly in advance of the point at which the fruit is to be fed to the belt. The rollers 25 are so arranged that the deflected portions of the belt flanges 23, 24 will be approximately parallel, thus providing an opening of ample size to receive the fruit, which will be delivered to the belt by an inclined feed conveyor or chute 26 located below the rollers 25.

In order that the point at which fruit is admitted to the belt may be adjusted to various locations along the length of the conveyor, thus facilitating picking operations at different elevations, the rollers 25 and the feed chute 26 are mounted upon a carriage 27 which is adjustable along the conveyor frame 14. A pair of spaced side plates 28 form the body of the carriage 27, the inner ends of the side plates being located between the frame uprights 16 and provided with guide rollers 29 engaged in channels in said uprights. The carriage 27 is adapted to be supported and vertically adjusted by suitable means such as a hydraulic ram 30, the lower end of the ram being mounted upon a cross-member 31 extending between the uprights 16, while the piston rod 32 of the ram is attached to a cross-member 33 on the carriage 27.

As best seen in Figs. 1 and 3, the carriage side plates 28 extend outwardly at opposite sides of the conveyor belt 21, and carry the feed chute 26 between them in a position directed toward the belt. The rollers 25, are, of course, located far enough above the feed chute 26 to provide ample clearance for the passage of the fruit, said rollers being supported by a bracket 34 which is secured between the side plates 28 and which likewise provides ample clearance for the fruit.

The outer end portion of the carriage 27 has a depending bracket 35 supporting a platform 36 upon which a fruit picker may stand in such a position that he may easily reach both the fruit to be picked and the feed chute 26. The carriage 27 preferably will also have a curved rail 37 which will serve as a guard for the picker.

From the above description, it will be apparent that the picked fruit may be placed in the feed chute 26, along which it will pass by gravity until it enters between the portions of the belt flanges 23, 24 which are spread by the rollers 25. Inasmuch as the impact of the fruit entering the belt 21 may tend to deflect the belt away from the rollers 25, the belt 21 is preferably maintained in a predetermined relationship to the rollers 25 by means of a backing roller 38 mounted upon the carriage 27 and engaging the outer surface of the base portion 22 of the belt.

When each individual fruit leaves the end of the feed chute 26, it may drop a short distance because of the fact that the belt flanges 23, 24 are in a spread condition at this point, and therefore cannot exert their full gripping action. However, the belt flanges 23, 24 will rapidly converge below the feed chute 26, so that the fruit can drop no more than a very short distance before it is fully engaged and held by the inner surfaces of the belt. It will thus be seen that the fruit will be individually held as it is carried downwardly by the belt 21.

When the fruit approaches the lower end of the conveyor, it will encounter the curved upper end of a discharge chute 39 which is located between the belt flanges 23, 24. The discharge chute 39 will interrupt the downward movement of the fruit, and will draw it out of the belt 21 and guide it outwardly into a suitable receptacle 40 which may be supported upon the truck 10. It will be noted, however, that the discharge chute 39 will not be relied upon for forcibly withdrawing the fruit from the belt, inasmuch as the belt flanges 23, 24 will be held in an outwardly deflected position at this point by a pair of spaced rollers 41 engaged between said flanges directly below the discharge chute 39. The rollers 41 are similar in construction to the rollers 25 upon the carriage 27, and are supported upon the frame uprights 16 by a bracket 42 comprising a cross-bar 43 which is disposed outwardly of the belt 21 and which carries the chute 39.

In the event that the fruit is to be discharged from the conveyor always at the same elevation, the bracket 42 may be made integral with the uprights 16, as shown in Fig. 3. If adjustment of the point of discharge is desired, however, the bracket 42 will be adjustably mounted in vertically slotted guides 44 on the uprights 16 by means of clamping bolts 45, as shown in Fig. 7. The bracket 42 is provided with a backing roller 46 which engages the base portion of the belt 21, thus insuring that the belt will be maintained in proper operating relationship to the discharge chute 39 and the rollers 41.

In order to operate the conveyor, the truck 10 carries a suitable motor 47 which is adapted to rotate the lower conveyor pulley shaft 20 by means of a drive belt 48 engaged over pulleys connected to said motor and to said shaft. The motor 47 may provide power also for operating the carriage lifting ram 30 and for propelling the truck 10, and it will be will be within the province of those skilled in the art to provide operating controls which will be accessible to the picker upon the platform 36.

In operation, the fruit picker will stand upon the platform 36, which will be located in such a position that a certain area of the tree will be easily accessible to the picker. The picked fruit will be placed in the feed chute 26, which will also be within easy reach of the picker at all times, and the fruit will then enter the conveyor belt 21 which will gently grip it and carry it downwardly. When the fruit reaches the discharge chute 39, it will be removed from the belt 21 and deposited in the box 40.

When it is necessary for the picker to reach a different area of the tree, the carriage 27 will be shifted so as to move the picker as desired, it being understood that vertical movements of the carriage will be accomplished by operating the ram 30, while movements in a direction around or radially of the tree will be accomplished by maneuvering the truck 10.

I now claim:

1. In a combination of the class described, a truck, traveling belt members, means resiliently connecting said members in opposed relationship, said members having frictional holding surfaces for gripping fruit fed into position between said members, means mounting said traveling members for movement in a predetermined path relatively to said truck, a pair of rollers engaged between said members for deflecting portions of said members away from each other at a point in said path to facilitate movement of fruit between said members, and means directed between the deflected portions of said traveling members for conveying the fruit in a direction at an angle to said predetermined path.

2. In a combination of the class described, a truck, traveling belt members, means mounting said traveling members for movement in a predetermined path relatively to said truck in opposed relationship, said members having frictional holding surfaces for gripping fruit fed into position between said members, means for deflecting said members away from each other at a point in said predetermined path to facilitate admission of fruit therebetween, and a second means for deflecting said members away from each other at another point in said path to release the article from the friction of said surfaces and facilitate movement of the fruit from between said members.

3. In a combination of the class described, a truck, traveling members, means mounting said traveling members for movement in a predetermined path relatively to said truck in opposed relationship, said members having frictional holding surfaces for gripping fruit fed into position between said members, a carriage, means mounting said carriage for movement along said predetermined path, and means on said carriage for deflecting said members away from each other to facilitate movement of the fruit between said members.

4. In a combination of the class described, a truck, traveling members, means resiliently connecting said members in opposed relationship, said members having frictional holding surfaces for gripping fruit fed into position between said members, means mounting said traveling members for movement in a predetermined path relatively to said truck, a carriage, means mounting said carriage for movement along said predetermined path, means on said carriage for deflecting said members away from each other to facilitate movement of fruit between said members, and means for conveying the fruit in a direction at an angle to said predetermined path, said conveying means being mounted on said carriage and directed between said frictional holding surfaces adjacent said deflecting means.

5. In a combination of the class described, a truck, an endless belt, means mounting said belt for movement in a predetermined path relatively to said truck, a pair of convergent longitudinally disposed side flanges on said belt urged resiliently toward each other, said flanges having frictional holding surfaces for holding fruit therebetween, means for admitting fruit to a position between said surfaces at a predetermined point in said path, and means for releasing said fruit from between said surfaces at a second predetermined point in said path.

6. In a combination of the class described, a truck, an endless belt, means mounting said belt for movement in a predetermined path relatively to said truck, longitudinally disposed resilient side flanges providing a longitudinal channel in said belt, said flanges being adapted to hold fruit frictionally in said channel, a feed conveyor for admitting fruit to said channel at a predetermined point in said path, and a discharge conveyor for removing said fruit from said channel at a second predetermined point in said path.

7. In a combination of the class described, a truck, an endless belt, means mounting said belt for movement in a predetermined path relatively to said truck, resilient side flanges providing a longitudinal channel in said belt, said flanges having frictional holding surfaces for holding fruit in said channel, means for admitting fruit to said channel, a carriage supporting said admitting means for movement along said path, and means for releasing said fruit from said frictional holding surfaces at a point remote from said admitting means.

8. In a combination of the class described, a truck, an elongated frame on said truck, an endless belt, means mounting said belt on said frame for movement along said frame, resilient side flanges providing a longitudinal channel in said belt, said flanges having frictional holding surfaces for holding fruit in said channel, a carriage mounted for movement relatively to the truck along said frame, means on said carriage for admitting fruit to said channel, and means on said frame for releasing the fruit from said frictional holding surfaces adjacent said truck.

9. In a combination of the class described, a truck having an upright thereon, opposed members adapted to travel longitudinally on said upright, frictional holding surfaces on said opposed members for gripping fruit therebetween, a carriage provided with means for feeding fruit into frictional engagement between said surfaces, and means mounting said carriage for adjustment longitudinally on said upright whereby to feed said fruit to said holding surfaces at different elevations relatively to said truck.

10. In a combination of the class described, a truck having an upright thereon, upper and lower pulleys on said upright, an endless belt engaged over said upper and lower pulleys, resilient side flanges providing a longitudinal channel in said belt, said flanges having frictional holding surfaces for holding fruit in said channel, a carriage provided with means for spreading said flanges to eliminate substantially the frictional effect of said surfaces in a limited zone of said belt to facilitate admission of fruit to said channel, and means mounting said carriage for movement along said upright whereby to adjust relatively to said truck the elevation at which the fruit is admitted to said channel.

11. In a combination of the class described, a truck having an upright thereon, upper and lower pulleys on said upright, an endless belt engaged over said upper and lower pulleys, resilient side flanges providing a longitudinal channel in said belt, said flanges having frictional holding surfaces for holding fruit in said channel, a carriage, means on said carriage for spreading said flanges in a limited zone of said belt to facilitate admission of fruit to said channel, means mounting said carriage for movement along said upright whereby to adjust relatively to said truck the elevation at which the fruit is admitted to said channel, means on said truck for supporting a receptacle, and means for discharging the fruit from between said frictional holding surfaces to a receptacle on said supporting means.

12. In a combination of the class described, a belt of resilient material having a longitudinally extending central base portion, opposed side flanges forming with said base portion a longitudinal channel for fruit in said belt, said belt by its resilience pressing said side flanges toward each other and toward said central base portion, and convex frictional holding surfaces on the side flanges of the belt for engaging fruit in said channel whereby to hold fruit of varying sizes therein.

13. In a combination of the class described, a belt of resilient material having a longitudinally extending central base portion, side flanges on opposed edges of said base portion, said belt by its resilience pressing said side flanges inwardly, and frictional holding surfaces on the side flanges of the belt in inclined relation to each other for engaging opposed sides of fruit whereby to hold fruit of varying sizes relatively to said base portion.

References Cited in the file of this patent

UNITED STATES PATENTS

| Number | Name | Date |
|---|---|---|
| 544,670 | Ingison | Aug. 20, 1895 |
| 622,586 | Allison et al. | Apr. 4, 1899 |
| 882,161 | Olive | Mar. 17, 1908 |
| 1,645,600 | Kohler | Oct. 18, 1927 |
| 1,991,137 | Case et al. | Feb. 12, 1935 |
| 2,199,935 | Johns | May 7, 1940 |
| 2,548,111 | Johns et al. | Apr. 10, 1951 |

FOREIGN PATENTS

| Number | Country | Date |
|---|---|---|
| 268,133 | Great Britain | Mar. 31, 1927 |
| 576,661 | Great Britain | Apr. 15, 1946 |